(12) United States Patent
Ruiz

(10) Patent No.: US 10,028,592 B1
(45) Date of Patent: Jul. 24, 2018

(54) CARRIER WITH A MULTI-PURPOSE HANDLE ASSEMBLY

(71) Applicant: Delia P. Ruiz, Cathedral City, CA (US)

(72) Inventor: Delia P. Ruiz, Cathedral City, CA (US)

( * ) Notice: Subject to any disclaimer, the term of this patent is extended or adjusted under 35 U.S.C. 154(b) by 0 days.

(21) Appl. No.: 15/802,902

(22) Filed: Nov. 3, 2017

(51) Int. Cl.
*A47D 13/02* (2006.01)
*B60N 2/28* (2006.01)

(52) U.S. Cl.
CPC ......... *A47D 13/025* (2013.01); *B60N 2/2845* (2013.01); *B60N 2/2821* (2013.01)

(58) Field of Classification Search
CPC .. A47D 13/025; B60N 2/2845; B60N 2/2821; B60N 2/2806
USPC .................. 297/183.3, 130, 250.1
See application file for complete search history.

(56) References Cited

U.S. PATENT DOCUMENTS

| | | | |
|---|---|---|---|
| 3,596,986 A | 8/1971 | Ragsdale | |
| 3,934,934 A * | 1/1976 | Farrell, Jr. | B60N 2/2806 297/467 |
| 3,976,328 A * | 8/1976 | Stahel | A47D 1/002 248/455 |
| 4,634,177 A | 1/1987 | Meeker | |
| 4,750,783 A * | 6/1988 | Irby | B60N 2/2848 297/130 |
| 4,915,446 A | 4/1990 | Darling et al. | |
| 5,360,258 A | 11/1994 | Alivizatos | |
| 5,411,315 A | 5/1995 | Greenwood | |
| 5,460,430 A | 10/1995 | Miga, Jr. et al. | |
| 5,507,564 A | 4/1996 | Huang | |
| 5,509,721 A | 4/1996 | Huang | |
| 5,567,008 A | 10/1996 | Cone, III | |
| 5,722,720 A * | 3/1998 | Lumley | B60N 2/2821 297/216.11 |
| 5,775,770 A | 7/1998 | Tunney | |
| D402,152 S | 12/1998 | Seats et al. | |
| 6,145,927 A * | 11/2000 | Lo | A47D 13/025 297/183.3 |
| 6,283,545 B1 | 9/2001 | Ernst | |
| 6,341,818 B1 | 1/2002 | Verbovszky et al. | |
| 6,594,840 B2 | 7/2003 | Tomas et al. | |
| 7,270,372 B2 | 9/2007 | Robertson | |
| 7,909,400 B1 * | 3/2011 | Delaney | B60N 2/2821 297/250.1 |
| 9,771,006 B2 * | 9/2017 | Forbes | B60N 2/2812 |
| 2002/0167214 A1 * | 11/2002 | Nelson | A47D 1/103 297/485 |
| 2012/0256467 A1 * | 10/2012 | Pettingill | A47C 23/06 297/452.55 |
| 2012/0319438 A1 * | 12/2012 | Kim | B60N 2/2812 297/163 |

FOREIGN PATENT DOCUMENTS

WO    2004/024492 A1    3/2004

* cited by examiner

*Primary Examiner* — Milton Nelson, Jr.

(57) ABSTRACT

Disclosed herein is a lightweight infant carrier that may act as an infant insert when placed in a car seat but can also be lifted out and utilized to transport an infant in the carrier, leaving the traditional car seat behind. The lightweight infant carrier may also stand on its own when placed elsewhere.

15 Claims, 4 Drawing Sheets

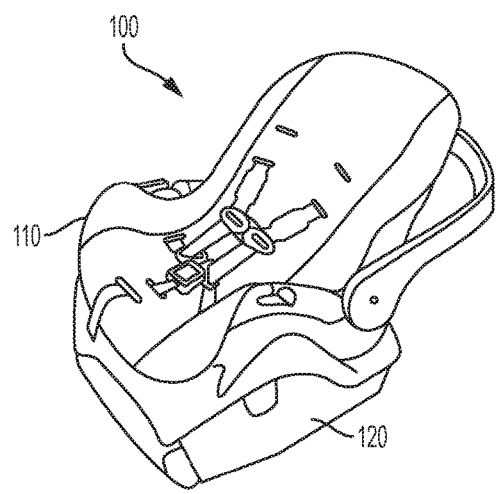
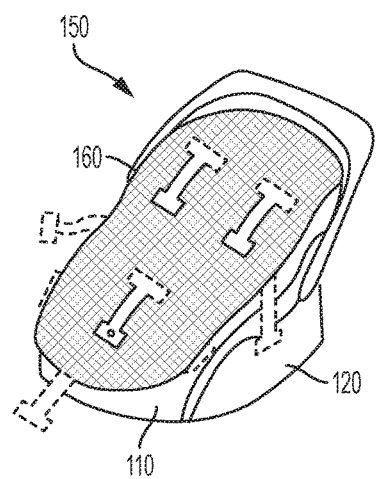
FIG. 1A  FIG. 1B
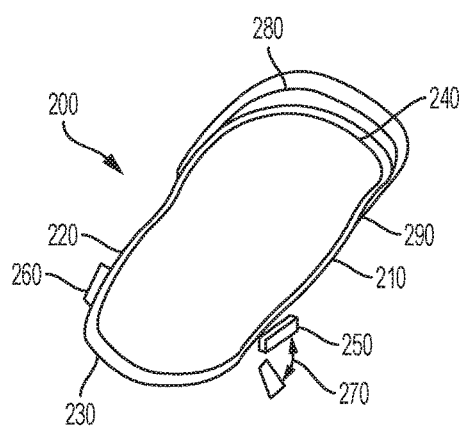
FIG. 2A
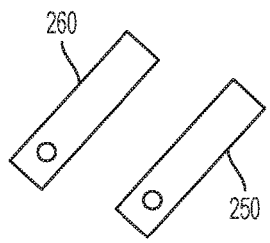
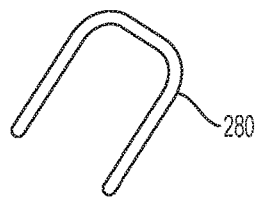
FIG. 2B  FIG. 2C

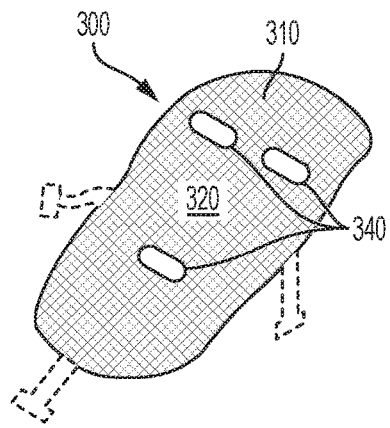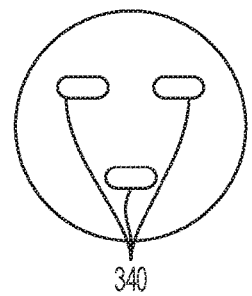
FIG. 3A       FIG. 3B
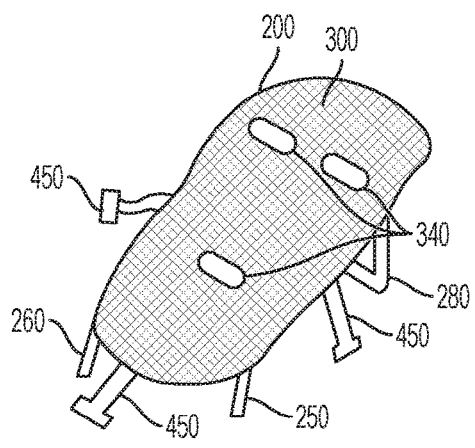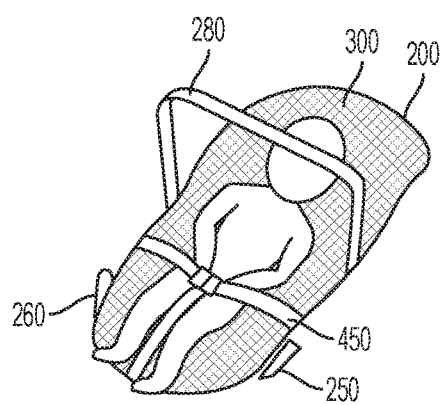
FIG. 4        FIG. 5

CARRIER WITH A MULTI-PURPOSE HANDLE ASSEMBLY

TECHNICAL FIELD

Embodiments of the disclosure relate to the field of infant carriers. More particularly, embodiments of the disclosure relate to a lightweight infant carrier that may be utilized as an infant "insert" in a traditional car seat and as an infant carrier that, when lifted out of the traditional car seat, may be placed sturdily on a flat surface.

BACKGROUND

Different products are utilized for supporting infants while they are sitting or reclining, such as bassinets and bouncers. These devices are usually unsuitable for carrying and transporting an infant comfortably from one place to another.

In order to transport an infant, individuals resort to the use of a traditional infant car seat. However, traditional infant car seats are bulky and heavy. The added weight of the car seat and the infant exert significant strain on a lifter's back. As a result, individuals may choose to remove an infant out of the car seat when exiting a vehicle which may interrupt an infant's sleep if the infant fell asleep during the commute.

BRIEF DESCRIPTION OF THE DRAWINGS

The above and other features of the present disclosure, their nature, and various advantages will become more apparent upon consideration of the following detailed description, taken in conjunction with the accompanying drawings which are not necessarily drawn to scale and wherein:

FIG. 1A illustrates a perspective view of a car seat placed on a car seat base;

FIG. 1B illustrates a perspective view of a carrier placed in a car seat according to an embodiment;

FIG. 2A illustrates a backbone of a carrier according to an embodiment;

FIG. 2B illustrates a plurality of legs extending from the first and the second side of the frame according to an embodiment;

FIG. 2C illustrates a handle assembly according to an embodiment;

FIG. 3A illustrates a fabric support member according to an embodiment;

FIG. 3B illustrates a blown up view of a plurality of gaps defined in the fabric of the fabric support member suitable for fitting a seat belt according to an embodiment;

FIG. 4 illustrates a perspective view of an assembled carrier according to an embodiment;

FIG. 5 illustrates a perspective view of an infant secured in a carrier according to an embodiment;

DETAILED DESCRIPTION

Figure 6A:
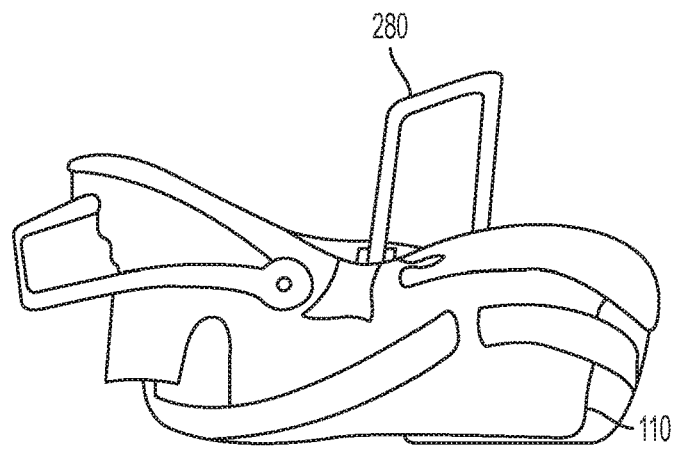
FIG. 6A illustrates a side view of a carrier placed in a car seat according to an embodiment.

In some embodiments, the present disclosure is directed to a lightweight fabric carrier. The lightweight fabric carrier may have a structure defined by a frame. The lightweight fabric carrier may have a form of a bouncy chair that is adapted to fit a car seat. The lightweight carrier may be suitable for a plurality of purposes, including but not limited to: acting as a car seat insert for an infant; acting as a carrier for transporting an infant; and being able to stand independently when placed on a flat surface. The lightweight carrier may also be utilized for hygienic purposes, for instance, when renting a vehicle with a car seat or ordering a cab with a car seat, the lightweight carrier may be used to ensure the infant is only in contact with their own gear.

An infant may be secured in the carrier and together, the infant and the carrier may be placed in a car seat. It may also be possible to insert the carrier into the car seat first and then secure the infant in the carrier that was already placed into the car seat. For transporting, the infant and the carrier may be lifted out of the car seat without moving the infant who may have settled in a comfortable position or have fallen asleep. Being able to transport the infant in the lightweight carrier eliminates the need to lift and/or transport a bulky and/or heavy car seat and reduces the strain exerted on the lifter's back.

The lightweight infant carrier also comprises at least one leg and a handle with a rotating and locking mechanism. The handle may be rotated and locked at a position in which at least a portion of the handle extends below the bottom side of the carrier to stabilize and/or suspend the carrier on a flat surface.

The embodiments described herein can provide a lightweight device that may be inserted in the traditional car seat during travel and may also have the capability to be lifted out of the car seat and placed on a flat surface to support an infant without having to move the infant (in case they have fallen asleep).

In some embodiments, the disclosure is directed to a carrier, comprising a frame having a first side and a second side spaced apart by a front part and a back part. The carrier may further comprise at least one leg extending from one or more of the first side, the second side, or the front part of the frame. The carrier may further comprise a fabric support member fitted within the frame and attached to the frame. The fabric support member may comprise a fabric having a top side and a bottom side. The top side of the fabric may be adapted to receive an infant. The carrier may further comprise a handle assembly. The handle assembly may comprise a handle and one or more rotating and locking mechanisms. The handle assembly may be attached to the first side and to the second side through the rotating locking mechanism. The rotating and locking mechanism may comprise a first position in which at least a portion of the handle extends above the top side of the fabric support member to facilitate carrying of the carrier. The rotating and locking mechanism may further comprise a second position in which at least a portion of the handle extends below the bottom side of the fabric support member to stabilize and/or suspend the carrier above a surface (e.g., a flat surface).

In some embodiments, the disclosure is directed to a system comprising a car seat and a carrier adapted to fit the car seat. The carrier may comprise a frame comprising a first side and a second side spaced apart by a front part and a back part. The carrier in the system may further comprise at least one leg extending from one or more of the first side, the second side, or the front part of the frame. The carrier in the system may further comprise a fabric support member fitted within the frame and attached to the frame. The fabric support member may comprise a fabric having a top side and a bottom side, wherein the top side may be adapted to receive an infant and the bottom side may face the car seat. The carrier in the system may further comprise a handle assembly. The handle assembly may comprise a handle and one or more rotating and locking mechanisms. The handle assembly may be attached to the first side and to the second side through the rotating locking mechanism. The rotating and locking mechanism may comprise a first position in which at least a portion of the handle extends above the top side of the fabric support member to facilitate carrying of the carrier. The rotating and locking mechanism may further comprise a second position in which at least a portion of the handle extends below the bottom side of the fabric support member to stabilize and/or suspend the carrier above a surface (e.g., a flat surface).

In some embodiments, the disclosure is directed to a kit for assembling a carrier. The kit may comprise a frame comprising a first side and a second side spaced apart by a front part and a back part. The kit may further comprise at least one leg to be extended from one or more of the first side, the second side, or the front part of the frame. The kit may further comprise a fabric support member comprising a fabric having a top side and a bottom side, wherein the top side is adapted to receive an infant. The kit may further comprise a handle assembly. The handle assembly may comprise a handle and one or more rotating and locking mechanisms. The handle assembly may be suitable to be attached to the first side and to the second side through the rotating and locking mechanism. The rotating and locking mechanism, when attached to the handle and to the first side and the second side, may comprise a first position in which at least a portion of the handle extends above the top side of the fabric support member to facilitate carrying of the carrier. The rotating and locking mechanism, when attached to the handle and to the first side and the second side, may further comprise a second position in which at least a portion of the handle extends below the bottom side of the fabric support member to stabilize and/or suspend the carrier above a surface (e.g., a flat surface).

In some embodiments, the disclosure is directed to a method of manufacturing a carrier and/or a system disclosed herein. In some embodiments, the disclosure is directed to a method of assembling a carrier and/or a system disclosed herein. In some embodiments, the disclosure is directed to a method of securing and/or carrying an infant in a carrier and/or system disclosed herein.

Referring now to the Figs. in more detail, FIG. 1A illustrates a perspective view of a system 100 comprising a conventional car seat 110 placed on a car seat base 120. The conventional car seat may weigh between about 15 to about 35 lbs. Unlike the conventional car seat, the lightweight carrier according to embodiments weighs up to about 15 lbs., up to about 10 lbs., or up to about 5 lbs.

FIG. 1B illustrates a perspective view of a system 150 according to an embodiment where lightweight carrier 160 is placed in car seat 110 which is attached to car seat base 120. Lightweight carrier 160, its various components, method of assembly, method of its use, and a kit comprising the carrier, will be described in more detail with respect to subsequent Figures.

FIG. 2A illustrates a backbone 200 of a carrier according to an embodiment. Backbone 200 may act as the component of carrier 160 that is responsible for defining the carrier's structure. For instance, backbone 200 may comprise a frame. In some embodiments, backbone 200 may comprise one or more of a frame, at least one leg, a handle assembly, or a combination thereof. The frame may have a first side 210 and a second side 220. First side 210 and second side 220 may be space apart by a front part 230 and a back part 240. First side 210, second side 220, front part 230, and back part 240 may together form a shape, such as an oval elongated shape or a rectangular shape with rounded corner for instance. The shape may be such that when a fabric support member is stretched across the various sides and parts of the frame, the resulting shape of the stretched fabric support member will be suitable for receiving an infant.

In certain embodiments, the frame may be made from a material selected from one or more of heavy duty plastic tubing, lightweight metal, ceramic, glass, plastic, wood, etc., and combinations thereof. Other optional parts of the backbone, such as at least one leg and/or the handle assembly may be made from a material selected from one or more of heavy duty plastic tubing, lightweight metal, ceramic, glass, plastic, wood, etc., and combinations thereof. The various components of backbone 200 may all be constructed from the same materials or from different materials.

In an embodiment, first side 210, second side 220, front part 230, and back part 240 may be manufactured as a single intact component. In other embodiments, one or more of the first side 210, second side 220, front part 230, and back part 240 may be manufactured separately as individual components and may include at least one attachment mechanism that will allow the individual components to be assembled with other individual components to form the final frame of carrier 160.

Backbone 200 may further comprise at least one leg attached to the frame. The at least one leg may extend from one or more of the first side 210, second side 220, or from the front part 230. In FIG. 2A, first leg 250 extends from first side 210 and a second leg 260 extends from second side 220. First leg 250 and second leg 260 may extend sidewise or forward. In certain embodiments, the first leg and the second leg extend forward from the first side and from the second side, respectively, and the first leg and the second leg are curved in reversed-L shape extending backwards relative to the front part of the frame (shown as numeral 610 and as numeral 620 in FIGS. 6B-6C). The reversed-L shape of the at least one leg extending from the frame may be adapted to receive a car seat or a combination of a car seat and a car seat base (e.g., as shown in FIG. 6A).

Figure 7A:
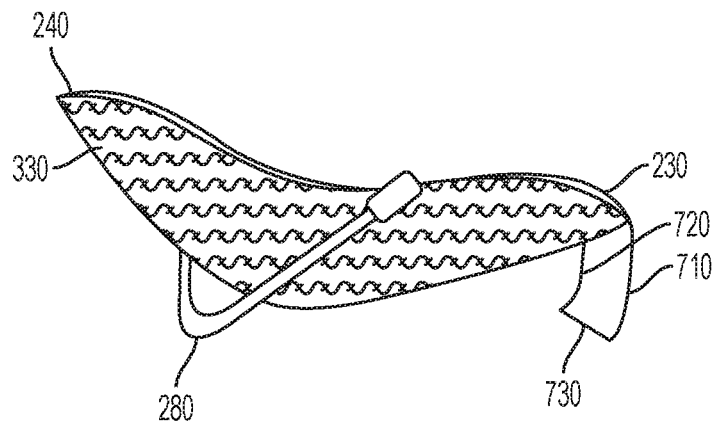
FIG. 7A illustrates a side view of a carrier places on a surface according to an embodiment.

In an embodiment shown in FIG. 7A, the at least one leg (composed of sections 710, 720, and 730) may include a U-shaped leg extending from first side 210 to second side 220, with the flat lower section 730 of the U shaped leg being placed adjacent to a flat surface and shaped to provide support for carrier 160 when it is positioned on a surface such as a flat surface (e.g., on a floor or on a table). In some embodiments, the U-shaped leg may have a uniform thickness and shape throughout its entire length. For instance, the U-shaped leg may be a U-shaped rounded rod having a diameter ranging from about 3 mm to about 3 cm, from about 3 mm to about 2 cm, or from about 3 mm to about 1 cm. In some embodiments, the U-shaped leg may have a uniform thickness and shape on the side and a different thickness and/or shape on the lower part so as to provide better support for carrier 160 when it is positioned on a flat surface.

For example, the side sections of the U-shaped leg, 710 and 720, may be rounded rods having a first thickness (i.e. diameter), and the bottom section 730 of the U shaped leg may be, for instance, a rounded rod having a second thickness that is thicker than the first thickness or have flat rectangular shape having a second thickness that is either the same or different from the first thickness. The first thickness or diameter may range from about 3 mm to about 3 cm, from about 3 mm to about 2 cm, or from about 3 mm to about 1 cm. The bottom part of the U shaped leg may be, for instance, a rod having a diameter ranging from about 3 mm to about 3 cm, from about 3 mm to about 2 cm, or from about 3 mm to about 1 cm. The bottom part of the U shaped leg may have, for instance, a flat rectangular shape having a thickness ranging from about 3 mm to about 3 cm, from about 3 mm to about 2 cm, or from about 3 mm to about 1 cm and a width ranging from about 3 mm to about 5 cm, from about 3 mm to about 3 cm, or from about 3 mm to about 1 cm.

Figure 7B:
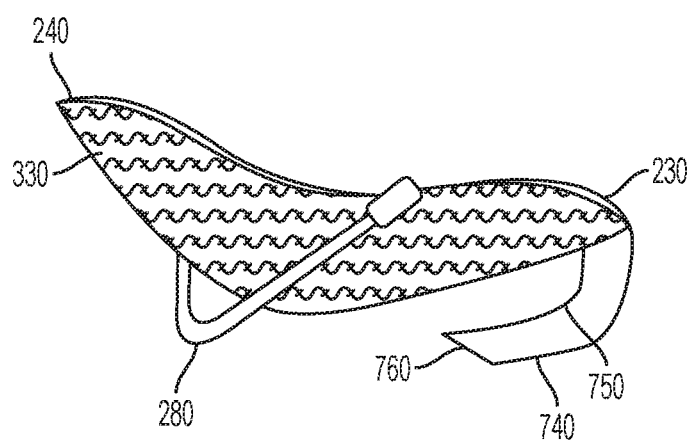
FIG. 7B illustrates a side view of a carrier places on a surface according to an embodiment.

In an embodiment shown in FIG. 7B, the at least one leg (composed of sections 740, 750, and 760) may include a "broken"-U-shaped leg, i.e. a U-shaped leg where the sides of the U-shaped leg, 740 and 750, are curved in a reversed L shape. The "broken"-U-shaped leg may be adapted to receive a car seat or a combination of a car seat and a car seat base. The shape and thickness of the sides and the shape and thickness of the bottom part (adjacent to a surface) forming the "broken" U shaped leg may vary and should not be construed as limiting.

In some embodiments, the at least one leg, regardless of its shape, along with the frame may be manufactured as a single, intact component. In other embodiments, the at least one leg, regardless of its shape, may be manufactured separately from the frame. In some embodiments, the at least one leg may itself be composed of a plurality of components that need to be assembled together, for example, three portions (two side portions and a bottom portion) may be assembled together to form a U shaped leg.

FIG. 2B illustrates a blown up view of a first leg 250 and a second leg 260 depicted in FIG. 2A as extending from first side 210 and second side 220, respectively. As illustrated in FIGS. 2A and 2B, the at least one leg, regardless of its shape, may comprise at least one attachment mechanism adapted to attach the at least one leg to the frame. The at least one attachment mechanism may be adapted to attach the at least one leg to the frame in a foldable manner. Thus, the at least one leg may be in a folded position when it is not utilized (for example, when the carrier is placed in the car seat) and may be in an unfolded or in an extended position when it is utilized (for example, when the carrier is placed on a flat surface). An exemplary attachment mechanism 270 is illustrated in FIG. 2A where first leg 250 may be rotatably folded when it is not needed or unfolded (i.e. extended) when it is needed. The rotating and locking mechanism of the at least one leg may also be referred to herein as a second rotating and locking mechanism.

Backbone 200 may further comprise a handle assembly 280 attached to the first side 210 and to the second side 220 through one or more rotating and locking mechanisms 290 allowing the handle to be secured in a plurality of pivoted positions relative to the frame. A blown up view of a handle assembly according to an embodiment is also depicted in FIG. 2C. In an embodiment, at least one of the plurality of pivoted positions of the handle assembly comprises the handle being under the bottom side of a fabric support member 300 (shown in FIG. 3A) at an angle greater than 180° relative to a plane between the first side 210 and the second side 220 as illustrated in FIG. 4 and in FIG. 6C. Thus, the one or more rotating and locking mechanisms may comprise a position in which at least a portion of the handle extends below the bottom side of the fabric support member to stabilize and/or suspend the carrier above a surface (e.g. a flat surface).

Figure 6B:
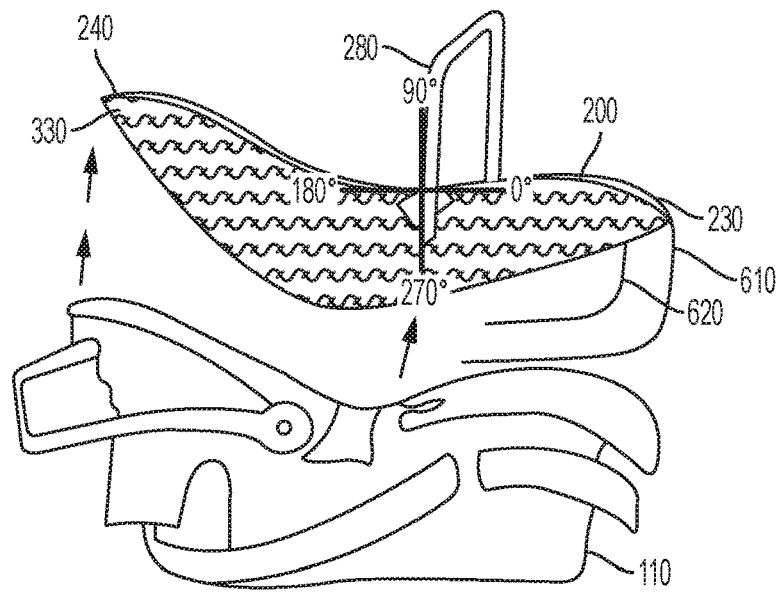
FIG. 6B illustrates a side view of a carrier lifted out of a car seat according to an embodiment.

In some embodiments, at least one of the plurality of pivoted positions of the handle assembly comprises the handle being above the top side of a fabric support member 300 at an angle of about 90° or between 90° and 180° as illustrated in FIG. 5 and in FIG. 6B. Thus, the one or more rotating and locking mechanisms may comprise a position in which at least a portion of the handle extends above the top side of the fabric support member to facilitate carrying the carrier.

In some embodiments, at least one of the plurality of pivoted positions of the handle assembly comprises the handle being below the bottom side of a fabric support member 300 at an angle of between 270° and 360°.

The one or more rotating and locking mechanisms allow the handle to reach a position of interest and securely lock at said position in a manner that would enable lifting the carrier, transporting the carrier, fitting the carrier in a car seat, or positioning the carrier on a flat surface.

FIG. 6B may provide for a better understanding of the handle's angles. As shown in FIG. 6B, a 0° angle is parallel to a flat surface (when the carrier is positioned on a flat surface) in the direction of front part 230 of the carrier, a 180° angle is parallel to a flat surface in the direction of back part 240 of the carrier, and one example of an angle greater than 180° (but less than 270°) relative to the first side 210 and to the second side 220 is depicted through the handle's position in FIG. 6C.

The handle assembly along with the frame and optionally alone with the at least one leg may be manufactured as a single, intact component referred to herein as the backbone. In other embodiments, the handle assembly may be manufactured separately from the frame and separately from the at least one leg. In some embodiments, the handle assembly may itself be composed of a plurality of components that need to be assembled together, for example, three portions (two side portions and a top portion) may be assembled together to form a reversed U shaped handle assembly. The handle assembly may comprise a portion that is ergonomically shaped for conveniently lifting and transporting the carrier.

FIG. 3A illustrates a fabric support member 300 according to an embodiment. In some embodiments, the fabric support member may be fitted within the frame and attached to the frame. The fabric support member may be fitted within the frame by stretching it across the various sides and front and back parts of the frame to form a shape that will be suitable for receiving an infant. The fabric support member may comprise a fabric 310 having a top side 320 and a bottom side 330 (shown in FIGS. 6B and 6C). Top side 320 may be adapted to receive an infant, as illustrated in FIG. 5. The fabric may be secured to the frame through a variety of attachment mechanisms, including but not limited to, by snapping the fabric support member to the frame, by sewing the fabric support member to or around the frame, by fastening the fabric support member to the frame. Exemplary fasteners may include one or more of: a zipper, a hook, Velcro®, a button, a snap, a lock, a magnet, a clasp, a ring, a screw, a rivet, an eyelet, a lace, a rope, a string, a cord, a belt, a chain, a strap, a slide, a buckle, an adhesive (e.g., a silicone adhesive) or combinations thereof. In certain embodiments, the fabric may also be removed from the fabric support member for cleaning and/or to be replaced by another fabric.

In certain embodiments, fabric 310 may define a plurality of gaps in the fabric or seat belt hole cut outs 340 (depicted in a blown up view in FIG. 3B and shown in FIG. 4) suitable for fitting a seat belt of a car seat or a seat belt of a car. When the carrier is placed in a car seat, the seat belts from the infant car seat or from the car may be pulled through the plurality of gaps defined in the fabric, so as to buckle and secure the infant safely in the car seat while traveling in the vehicle. When it is time to lift the infant and the carrier out of the vehicle, the seat belt of the traditional car seat may be unbuckled and left behind while the infant may remain secure in the carrier due to the carrier's own securing mechanism.

Suitable fabrics for fabric support member 300 may include strong mesh fabrics. In some embodiments, the fabric may be light and porous to help keep an infant secured in the carrier cool on hot summer days. In some embodiments, the fabric may be dense and warm to help keep an infant secured in the carrier warm on cold winter days. The plurality of gaps in the fabric or seat belt hole cut outs 340 may be constructed out of reinforced material to minimize and preferably prevent tearing.

In some embodiments, the material forming fabric 310 may include but not be limited to one or more of cotton, polyester, silk, fur, wool, knit, leather, natural and/or woven materials, etc. and combinations thereof. The fabric may have different colors including patterns and/or solid colors or any combination thereof. The fabric may include decorative details such as embroidery, words, phrases, drawings, illustrations, logos, beads, cords, braids, knots, thread, fringe, tassels, applique, buttons, edging, stitches, studs, nails, etc. The fabric may be transparent, sheer, partially sheer, translucent, partially opaque, completely opaque, etc. The fabric may be elastic, stretchy, flexible, supple, semi-ridges, stiff, very ridged, etc.

FIG. 4 illustrates a perspective view of an assembled carrier including the frame, handle assembly 280, at least one leg 250 and 260, and the fabric support member 300 fitted within frame 200, according to an embodiment. As illustrated in FIG. 4, the assembled carrier may further include a securing mechanism 450 (e.g., seat belts attached to the carrier itself) for safely securing an infant in the carrier as illustrated in FIG. 5. Securing mechanism 450 allows a user to lift the carrier out of the car seat while ensuring that the carrier continues to hold the buckled infant securely in the carrier itself (outside of the car seat). Securing mechanism 450 may be constructed out of durable material such as nylon webbing or any other material suitable for a seat belt.

Figure 6C:
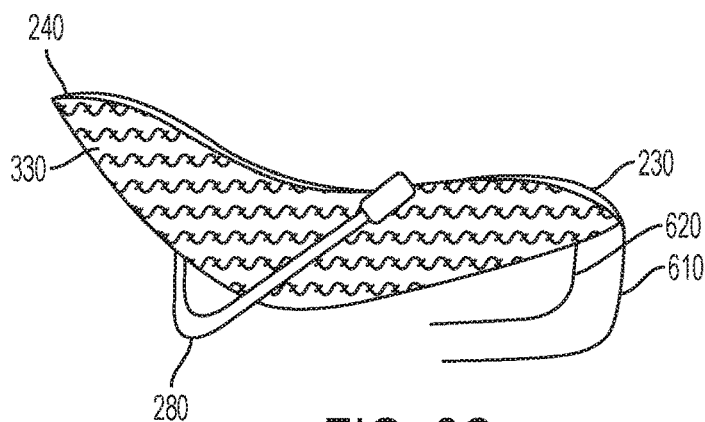
FIG. 6C illustrates a side view of a carrier placed on a surface according to an embodiment.

FIGS. 6A, 6B, and 6C illustrate a side view of a carrier placed in a car seat, a carrier lifted out of a car seat, and a carrier placed on a surface, respectively, according to an embodiment. FIG. 6A illustrates how a carrier according to an embodiment may be safely installed in a car seat and used in a vehicle. FIG. 6B illustrates that when it is necessary to lift the baby from the infant car seat, a carrier according to an embodiment along with the infant secured in the carrier (infant is not shown in FIG. 6B) may be removed. Handle assembly 280 may be rotated and secured under the bottom side of the fabric support member at an angle greater than 180° relative to a plane between the first side and the second side (the plane being parallel to a flat surface) such that when the handle assembly is pivoted to this position, the handle assembly together with the at least one leg stabilize and/or suspend the carrier when positioned on a flat surface.

Carriers according to various embodiments discussed herein are suitable for holding an infant weighing up to about 25 lbs., up to about 20 lbs., or up to about 15 lbs. In some embodiments, the carriers discussed herein are lightweight and may weigh up to about 20 lbs., up to about 15 lbs., up to about 10 lbs., or up to about 5 lbs. The lightweight nature of a carrier according to the embodiments discussed herein make carrying an infant so much lighter and reduces strain from the lifter's back.

In some embodiments, the present disclosure is directed to a system comprising an infant car seat and a carrier adapted to fit the infant car seat as discussed hereinabove in more detail.

In some embodiments, the present disclosure is directed to a kit comprising a carrier as discussed hereinabove in more detail. The kit may further comprise on or more of an infant car seat, base for the infant car seat, assembly instructions, or a combination of any two or more thereof.

In some embodiments, the present disclosure is directed to a method of manufacturing a carrier as discussed hereinabove in more detail.

In some embodiments, the present disclosure is directed to a method of assembling a system comprising an infant car seat and a carrier adapted to fit the infant car seat as discussed hereinabove in more detail.

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments.

Although the embodiments disclosed herein have been described with reference to particular embodiments it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation.

What is claimed is:
1. A carrier, comprising:
a frame comprising a first side and a second side spaced apart by a front part and a back part, a first leg extending from the first side and a second leg extending from the second side;

a fabric support member fitted within the frame and attached to the frame, the fabric support member comprising a fabric having a top side and a bottom side, wherein the top side is adapted to receive an infant; and a handle having a first position in which at least a portion of the handle extends above the top side of the fabric support member to facilitate carrying of the carrier and a second position in which at least a portion of the handle extends below the bottom side of the fabric support member to stabilize the carrier above a flat surface, wherein the handle in the second position, the first leg, and the second leg stabilize the carrier when positioned on a flat surface, wherein the carrier acts as a car seat insert for an infant, wherein the carrier weighs up to about 5 lbs.

2. The carrier of claim 1, wherein a plurality of gaps in the fabric suitable for fitting a seat belt of a car seat are defined in the fabric.

3. The carrier of claim 1, wherein the fabric further comprises a securing mechanism for securing the infant in the carrier.

4. The carrier of claim 1, and wherein the first leg and the second leg are curved in a reversed-L shape extending backwards relative to the front part of the frame.

5. The carrier of claim 4, wherein the reversed-L shape is adapted to receive a car seat or a combination of a car seat and a car seat base.

6. A system comprising:
a car seat; and
a carrier adapted to fit the car seat, wherein the carrier acts as a car seat insert for an infant, wherein the carrier weighs up to 5 lbs, and wherein the carrier comprises:
  a frame comprising a first side and a second side spaced apart by a front part and a back part,
  a first leg extending from the first side and a second leg extending from the second side;
  a fabric support member fitted within the frame and attached to the frame, the fabric support member comprising a fabric having a top side and a bottom side, wherein the top side is adapted to receive an infant, and wherein the bottom side faces the car seat; and
  a handle having a first position in which at least a portion of the handle extends above the top side of the fabric support member to facilitate carrying of the carrier and a second position in which at least a portion of the handle extends below the bottom side of the fabric support member to stabilize the carrier above a flat surface;

wherein the handle in the second position, the first leg, and the second leg stabilize the carrier when removed from the car seat and positioned on a flat surface.

7. The system of claim 6, wherein the car seat comprises a seat belt, and wherein a plurality of gaps in the fabric suitable for fitting the seat belt are defined in the fabric.

8. The system of claim 6, wherein the first leg and the second leg of the carrier can be secured in a plurality of positions.

9. The system of claim 8, wherein the plurality of positions that the first leg and the second leg may be secured in comprise a folded position and an extended position.

10. The system of claim 6, wherein the first leg and the second leg are curved in a reversed-L shape extending backwards relative to the front part of the frame.

11. The system of claim 10, wherein the reversed-L shape is adapted to receive the car seat or a combination of the car seat and a car seat base.

12. A kit for assembling a carrier, comprising:
a frame comprising a first side and a second side spaced apart by a front part and a back part,
a first leg to be extended from the first side and a second leg to be extended from the second side;
a fabric support member comprising a fabric having a top side and a bottom side, wherein the top side is adapted to receive an infant; and
a handle having a first position in which at least a portion of the handle extends above the top side of the fabric support member to facilitate carrying of the carrier and a second position in which at least a portion of the handle extends below the bottom side of the fabric support member to stabilize the carrier above a flat surface,
wherein the handle in the second position, the first leg, and the second leg stabilize the assembled carrier when positioned on a flat surface,
wherein the assembled carrier acts as a car seat insert for an infant, and wherein the assembled carrier weighs up to 5 lbs.

13. The kit of claim 12, further comprising assembly instructions.

14. The kit of claim 12, further comprising a car seat, a car seat base, or both.

15. The kit of claim 12, wherein a plurality of gaps in the fabric suitable for fitting a seat belt of a car seat are defined in the fabric.

* * * * *